United States Patent
Jin et al.

(10) Patent No.: US 10,141,584 B2
(45) Date of Patent: Nov. 27, 2018

(54) SEPARATOR OF FUEL CELL AND FUEL CELL HAVING THE SAME

(71) Applicant: Hyundai Motor Company, Seoul (KR)

(72) Inventors: Sang Mun Jin, Yongin-si (KR); Yoo Chang Yang, Gunpo-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 63 days.

(21) Appl. No.: 15/366,955

(22) Filed: Dec. 1, 2016

(65) Prior Publication Data
US 2017/0358804 A1   Dec. 14, 2017

(30) Foreign Application Priority Data

Jun. 9, 2016 (KR) .................. 10-2016-0071409

(51) Int. Cl.
| | |
|---|---|
| *H01M 8/0258* | (2016.01) |
| *H01M 8/0256* | (2016.01) |
| *H01M 8/1004* | (2016.01) |
| *H01M 4/94* | (2006.01) |
| *H01M 8/0247* | (2016.01) |

(52) U.S. Cl.
CPC .......... *H01M 8/0258* (2013.01); *H01M 4/94* (2013.01); *H01M 8/0247* (2013.01); *H01M 8/0256* (2013.01); *H01M 8/1004* (2013.01); *H01M 2250/10* (2013.01); *H01M 2250/20* (2013.01); *H01M 2250/30* (2013.01); *Y02B 90/14* (2013.01); *Y02B 90/18* (2013.01); *Y02T 90/32* (2013.01)

(58) Field of Classification Search
None
See application file for complete search history.

(56) References Cited

U.S. PATENT DOCUMENTS

| | | | | |
|---|---|---|---|---|
| 9,782,853 | B2 * | 10/2017 | Muller | ............... B23K 11/0026 |
| 2005/0250002 | A1 * | 11/2005 | Stanley | ................. H01M 4/861 |
| | | | | 429/483 |
| 2007/0178359 | A1 * | 8/2007 | Peng | ................... H01M 8/0258 |
| | | | | 429/444 |
| 2013/0149633 | A1 * | 6/2013 | Jeong | .................. H01M 8/0258 |
| | | | | 429/514 |

FOREIGN PATENT DOCUMENTS

| | | |
|---|---|---|
| JP | 2000-223137 A | 8/2000 |
| JP | 2005-209470 A | 8/2005 |

(Continued)

OTHER PUBLICATIONS

KR1020160052872. Kim et al. Korea. May 2016 (Year: 2016).*
Office Action dated Jun. 15, 2017, issued in corresponding Korean Patent Application No. 10-2016-0071409.

*Primary Examiner* — Jonathan G Leong
*Assistant Examiner* — Christopher P Domone
(74) *Attorney, Agent, or Firm* — McDermott Will & Emery LLP (57) ABSTRACT

A separator for a fuel cell includes a plurality of channels; and an inlet hole and an outlet hole formed in a first side and a second side of the plurality of channels, respectively, such that a reaction gas flows into and out from the separator to be exposed to a reaction surface including a membrane electrode assembly. The inlet hole is larger in size than the outlet hole.

8 Claims, 6 Drawing Sheets

Invention

(56) References Cited

FOREIGN PATENT DOCUMENTS

| | | | |
|---|---|---|---|
| JP | 2010-251020 A | | 11/2010 |
| KR | 10-2009-0096774 A | | 9/2009 |
| KR | 10-2013-0066795 A | | 6/2013 |
| KR | 10-2016-0052872 A | | 5/2016 |
| KR | 1020160052872 | * | 5/2016 |

* cited by examiner

Invention

[FIG. 2A]

Related art

[FIG. 2B]

Invention

[FIG. 3A]

Longitudinal direction of channel ↓

[FIG. 3B]

Short axis

Long axis

Inlet hole

[FIG. 3C]

Outlet hole

[FIG. 4A]

Flow of reaction gas of related art

[FIG. 4B]

Flow of reaction gas of invention

[FIG. 5]

SEPARATOR OF FUEL CELL AND FUEL CELL HAVING THE SAME

CROSS REFERENCE TO RELATED APPLICATION

The present application claims the benefit of priority to Korean Patent Application No. 10-2016-0071409, filed on Jun. 9, 2016 in the Korean Intellectual Property Office, the entirety of which is incorporated herein for all purposes by this reference.

TECHNICAL FIELD

The present disclosure relates to a separator for a fuel cell that can improve the reaction efficiency of the fuel cell by activating the flow of reaction gas that is supplied to the fuel cell, and to a fuel cell including the separator.

BACKGROUND

Recently, there has been increasing interest in alternative energy due to the exhaustion of fossil fuels and the problems associated with environmental contamination. In particular, there has been great interest in a fuel cell that generates electricity using a reaction between oxygen and hydrogen as an alternative energy source because it is easy to obtain the raw materials for the reaction and the reaction causes little environmental contamination.

A fuel cell, which is a kind of electricity generator that converts the chemical energy of fuel into electrical energy through an electrochemical reaction in a fuel cell stack without changing the chemical energy of the fuel into heat by burning the fuel, can be used not only for supplying power for industry, homes, and vehicles, but also for supplying power for small-sized electrical/electronic products, particularly mobile devices.

As an example of a fuel cell, a polymer electrolyte membrane fuel cell that is generally used as a power supplier for driving vehicles includes: a membrane-electrode assembly that is composed of an electrolyte membrane, through which hydrogen ions move, and catalytic electrodes in which an electrochemical reaction is generated and which are attached to both sides of the electrolyte membrane; a gas diffusion layer that uniformly distributes the reaction gases and transmits generated electrical energy; a gasket and fasteners that maintain airtightness and appropriate pressure against reaction gases and cooling water; and a separator in which the reaction gases and the cooling water move.

Hydrogen, as the fuel, and air, as the oxidizer in a fuel cell, are supplied to the anode and the cathode of a membrane-electrode assembly, respectively, through channels in a separator, that is, the hydrogen is supplied to the anode and the air is supplied to the cathode. The hydrogen supplied to the anode is decomposed into hydrogen ions and electrons by a catalyst in the electrode layers on both sides of the electrolyte membrane, in which only the hydrogen ions are selectively transmitted to the cathode through the electrolyte membrane, which is a cation exchange membrane, and the electrons are transmitted to the cathode through the gas diffusion layer and the separator that are conductors.

At the cathode, the hydrogen ions supplied through the electrolyte membrane and the electrons transmitted through the separator cause a reaction that produces water with the oxygen in the air supplied to the cathode by an air supplier. In this process, the electrons flow through an external wire due to the movement of hydrogen ions, and this flow of electrons is current.

Accordingly, separators generally have a structure in which lands where the separator and the gas diffusion layer are in contact and channels that function as paths for the flow of fluids (including a reaction gas and cooling water) are repeatedly curved, so the channel at a side facing the gas diffusion layer is used as a space where a reaction gas such as hydrogen or air flows and the opposite channel is used as a space where cooling water flows. Therefore, the separator is composed of a total of two separators, that is, one separator having the hydrogen/cooling water channel and one separator having the air/cooling water channel.

The description provided above as a related art of the present disclosure is just for helping understanding the background of the present disclosure and should not be construed as being included in the related art known by those skilled in the art.

The foregoing is intended merely to aid in the understanding of the background of the present disclosure, and is not intended to mean that the present disclosure falls within the purview of the related art that is already known to those skilled in the art.

SUMMARY

Accordingly, the present disclosure has been made in view of the above problems occurring in the related art, and the present disclosure is intended to propose a separator for a fuel cell that can improve the reaction efficiency of the fuel cell by increasing the flow speed of a reaction gas using the difference in size between an inlet hole and an outlet hole of a channel for a reaction gas, and a fuel cell including the separator.

In order to achieve the above object, according to one aspect of the present disclosure, there is provided a separator of a fuel cell including: a plurality of channels; and an inlet hole and an outlet hole formed in a first side and a second side of the plurality of channels, respectively, such that a reaction gas flows into and out from the separator to be exposed to a reaction surface including a membrane electrode assembly. The inlet hole is larger in size than the outlet hole.

The inlet hole and the outlet hole may be formed such that the reaction gas flowing into and out from the separator perpendicular to a longitudinal direction of the plurality of channels is guided to the reaction surface.

A plurality of inlet holes and outlet holes may be formed in the longitudinal direction of the channel and the centers of the inlet holes and the outlet holes are not aligned.

The centers of the inlet holes may be positioned higher above the reaction surface than the centers of the outlet holes.

The inlet holes and the outlet holes may have different shapes.

The inlet holes may have a rectangular shape and the outlet holes may have an elliptical shape.

The lengths of the long axis and the short axis of the outlet holes may be ½ or more of the lengths of the long axis and the short axis of the inlet holes, respectively.

The separator may be wavy, and the first side may be an inclined side through which the reaction gas flows into the separator and the second side may be an inclined side through which the reaction gas flows out from the separator.

According to another aspect of the present disclosure, there is provided a separator for a fuel cell including: a plurality of channels; and an inlet hole and an outlet hole respectively formed in a first side and a second side of the channels such that a reaction gas flows into and out from the separator, in which the inlet holes are larger in size than the outlet holes at an upstream side of the channels.

The difference in size between the inlet hole and the outlet hole at a downstream side of the channels through which the reaction gas is discharged may be smaller than the difference in size between an inlet hole and an outlet hole at an upstream side of the channels.

According to another aspect of the present disclosure, there is provided a fuel cell including: a separator for a fuel cell including a plurality of channels, and an inlet hole and an outlet hole respectively formed in a first side and a second side of the channels such that a reaction gas flows into and out from the separator, the inlet hole being larger in size than the outlet hole; and a gas diffusion layer disposed between a bottom of the separator and a membrane electrode assembly and activating and guiding the reaction gas flowing inside through the inlet hole to the membrane electrode assembly.

According to the present disclosure, since the outlet hole through which the reaction gas is discharged is smaller than the inlet hole through which the reaction gas flows in, the flow speed of the reaction gas gradually increases in a channel, so the disturbance of the flow of the reaction gas is accelerated and contact between the reaction gas and the gas diffusion layer is activated, thereby improving the reaction efficiency of a fuel cell. Further, water produced by a chemical reaction can be smoothly discharged, and it is possible to maintain the internal pressure difference in a cell at a predetermined level in order to maximize the efficiency of a fuel cell by adjusting the shapes of the inlet hole and the outlet hole.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION OF THE EMBODIMENTS

Hereinafter, exemplary embodiments in the present disclosure will be described in detail with reference to the accompanying drawings.

A separator 10 for a fuel cell according to an exemplary embodiment includes: a plurality of channels; and an inlet hole 12 and an outlet hole 14 formed in a first side and a second side of the channels so that a reaction gas can flow into/out of a fuel cell reaction surface including an MEA (Membrane Electrode Assembly), in which the inlet hole 12 is larger in size than the outlet hole 14, and the inlet hole 12 and the outlet hole 14 are formed such that a reaction gas flowing into the channels can vertically flow through the channels.

Figure 1A:
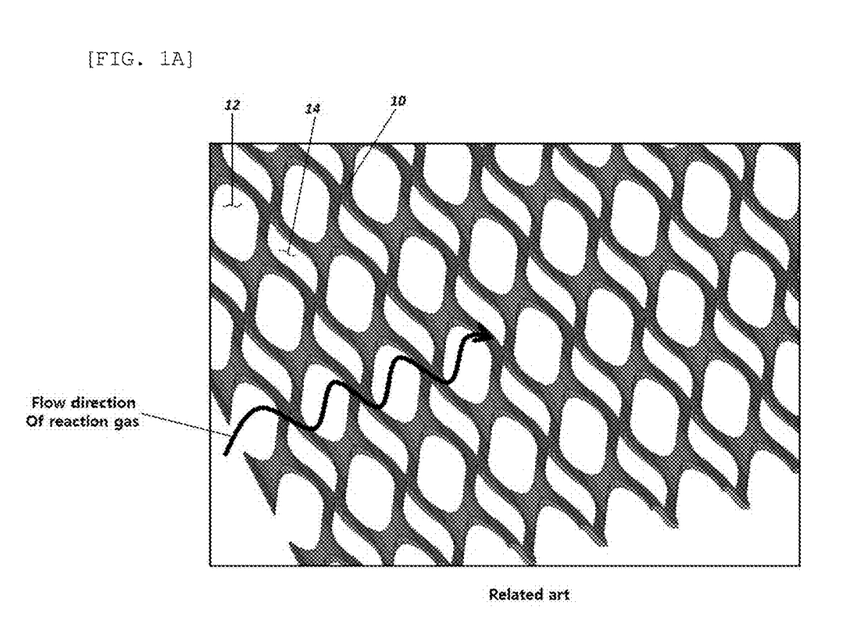
FIGS. 1A and 1B are views comparing the shapes of separators of a fuel cell according to the related art and the present disclosure.
Figure 1B:
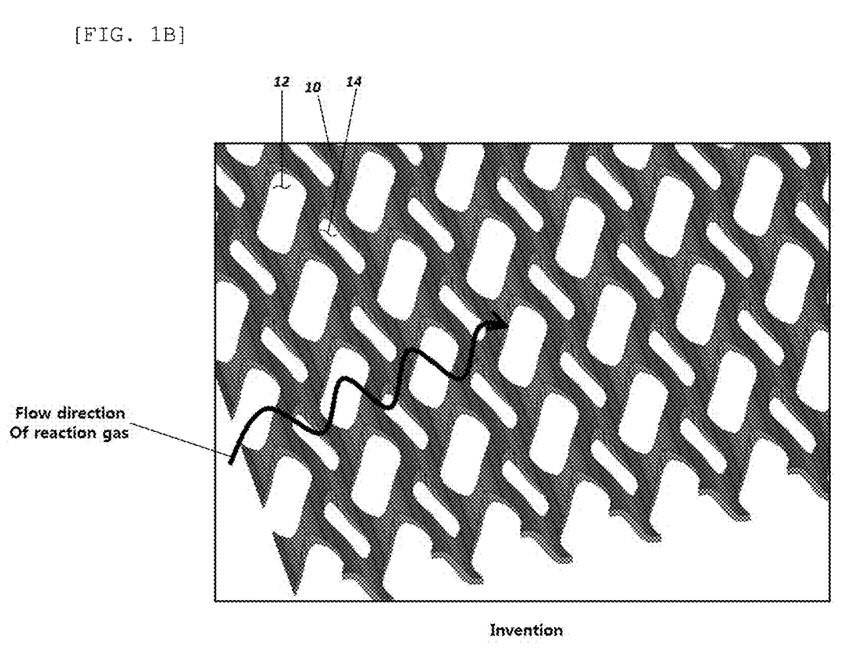

FIG. 1B shows the separator 10 for a fuel cell according to an exemplary embodiment and FIG. 1A shows a separator 10 of a fuel cell according to the related art to help understand the characteristics of the present disclosure. Before comparing the separators 10 according to the related art and the present disclosure, it should be noted that the related art may not have been known to those skilled in the art.

The separators 10 shown in FIGS. 1A and 1B are both porous separators 10, in which a reaction gas does not flow in the longitudinal direction of fuel cell channels, but flows through holes formed at a first side and a second side of channels in the separators 10 of a fuel cell. The separator 10 shown in FIG. 1A is a porous separator 10 in which the inlet hole 12 and the outlet hole 14 are the same in size. On the other hand, in the separator 10 shown in FIG. 1B, the inlet hole 12 and the outlet hole 14 through which a reaction gas flows are different in size. That is, the inlet hole 12 is larger in size than the outlet hole 14.

Figure 2A:
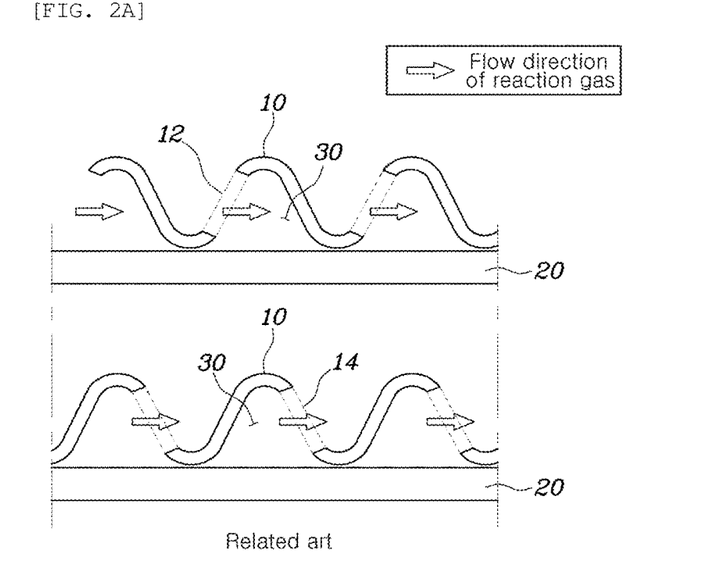
FIGS. 2A and 2B are views comparing the shapes of an inlet hole and an outlet hole of separators of a fuel cell according to the related art and the present disclosure.
Figure 2B:
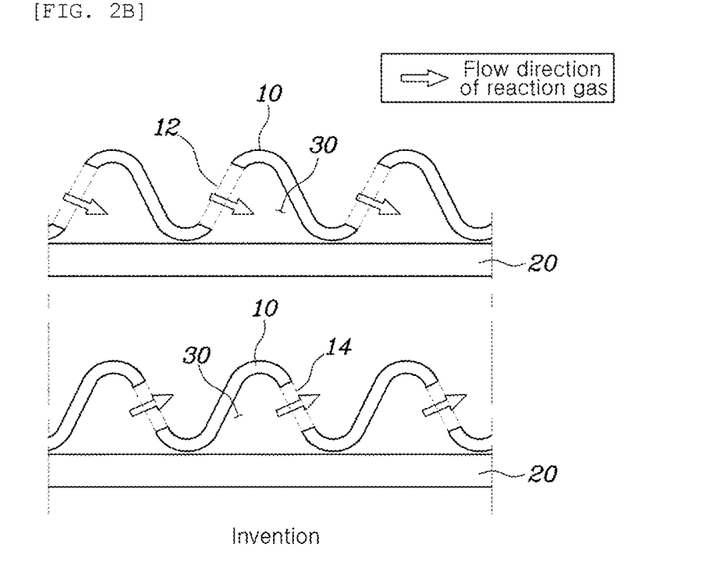

In order to easily distinguish the sizes of the inlet hole 12 and the outlet hole 14 of the separator 10, FIGS. 2A and 2B show the structures of the separators 10 according to the related art and the present disclosure, seen from one side. The separator 10 shown in FIG. 2A is wavy, in which the first side of the separator 10, through which the inlet hole 12 is formed, is an inclined side through which a reaction gas flows in and the second side of the separator 10, through which the outlet hole 14 is formed, is an inclined side through which a reaction gas flows out.

In detail, side views of the inlet hole 12 are shown in the upper portions in FIGS. 2A and 2B and side views of the outlet hole 14 of the separators 10 are shown in the lower portions. Accordingly, comparing the configurations shown in the upper and lower portions of FIG. 2A, the inlet 12 and the outlet 14 are curved at similar positions in the separator 10, so it may be considered that the inlet hole 12 and the outlet hole 14 are the same or very close in size. However, in the separator 10 according to the present exemplary embodiment shown in FIG. 2B, it can be seen that the inlet hole 12 is close in size to the inlet hole 12 of the separator 10 according to the related art, but the outlet hole 14 is smaller in size than the outlet hole of the related art.

The reason for making the inlet hole 12 and the outlet hole 14 different in size is to increase the disturbance of flow by increasing the speed at which gas flows through a channel of the separators 10, thereby increasing the reaction efficiency of a fuel cell and smoothly discharging the water produced by the chemical reaction.

The product of the cross-sectional area and the speed of fluid at the inlet hole 12 and the outlet hole 14 under the same flow rate are constant. In addition, a difference in size between the inlet hole 12 and the outlet hole 14 means that there is a difference in cross-sectional area between the inlet hole 12 and the outlet hole 14. In an exemplary embodiment in the present disclosure, in which the outlet hole 14 is smaller than the inlet hole 12, it can be seen that the flow speed of fluid at the outlet hole 14 is faster than the flow speed of fluid at the inlet hole 12. That is, reaction gas flowing into the inlet hole 12 gradually increases in speed and is then discharged through the outlet hole 14. Therefore, the waveform of the reaction gas is increased by the increase in speed and FIGS. 4A and 4B show in detail the flow paths of reaction gases.

Figure 4A:
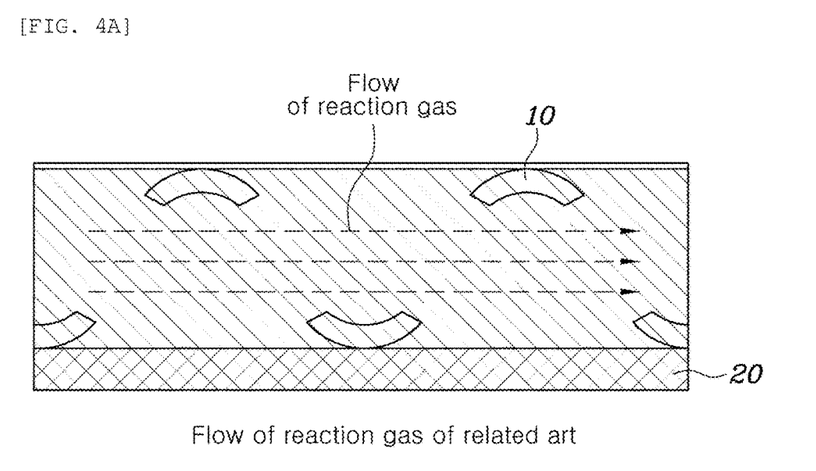
FIGS. 4A and 4B are views comparing the flow of a reaction gas in separators of a fuel cell according to the related art and the present disclosure.
Figure 4B:
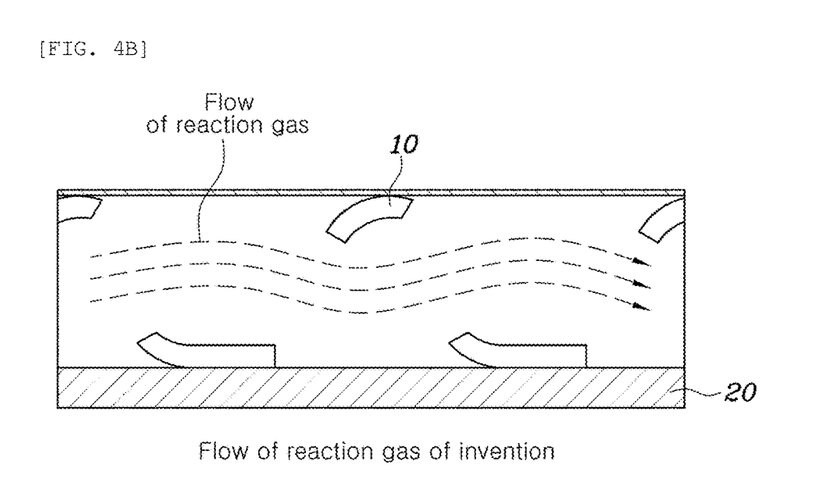

FIG. 4A shows the flow of reaction gas in a porous separator in which the inlet hole 12 and the outlet hole 14 are the same size in the related art, in which the flow of the reaction gas is straight without being wavy. However, according to an exemplary embodiment in the present disclosure, as shown in FIG. 4B, disturbance is generated in a reaction gas by the speed difference at the inlet hole 12 and the outlet hole 14, so waveforms are generated in the flow of the reaction gas. Accordingly, the possibility of the reaction gas coming into contact with the gas diffusion layer 20 under the separator 10 is increased by the waveforms. Therefore, more gas comes into contact with the gas diffusion layer 20, which means an increased probability for an increase in the number of ions flowing through the membrane electrode assembly, so the reaction efficiency of the fuel cell is improved. Further, as described above, the flow speed of the reaction gas is higher than in the related art, so it is possible to more smoothly discharge water produced by the chemical reaction, compared with the related art, and accordingly, it is possible to prevent flooding of the fuel cell and correspondingly improve the durability of the fuel cell.

Figure 3A:
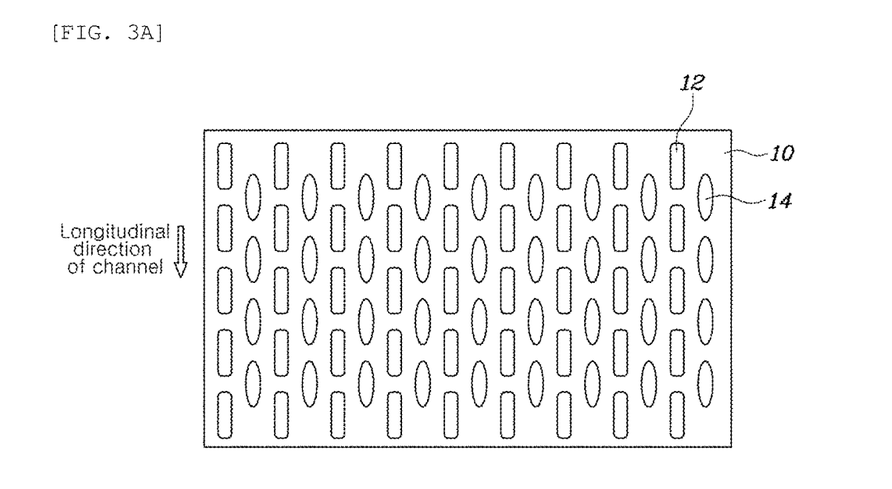
FIGS. 3A to 3C are views comparing an inlet hole and an outlet hole of a separator according to an exemplary embodiment in the present disclosure.

A plurality of inlet holes 12 and outlet holes 14 may be formed in the separator 10 for the fuel cell according to an exemplary embodiment, as shown in FIG. 3A, and they may be formed in the longitudinal direction of a channel. Further, the centers of the inlet holes 12 and the outlet holes 14 may not be aligned. This is because when the centers of the inlet holes 12 and the outlet holes 14 are aligned and the inlet holes 12 and the outlet holes 14 are formed parallel to each other, reaction gas flowing into the inlet holes 12 may be immediately discharged through the outlet holes 14 without coming into contact with the gas diffusion layer 20. Accordingly, the centers of the inlet holes 12 and the outlet holes 14 are not aligned in the present exemplary embodiment, thus providing sufficient time for the reaction gas flowing into the inlet holes 12 to react with the gas diffusion layer 20. Further, as shown in FIG. 2B, the centers of the inlet holes may be positioned higher above the reaction surface of a fuel cell than the centers of the outlet holes, in which case it is possible to increase the reaction time between a reaction gas and the gas diffusion layer 20.

Figure 3B:
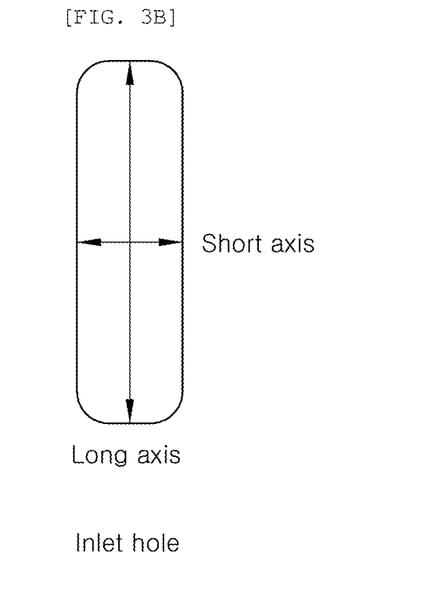
Figure 3C:
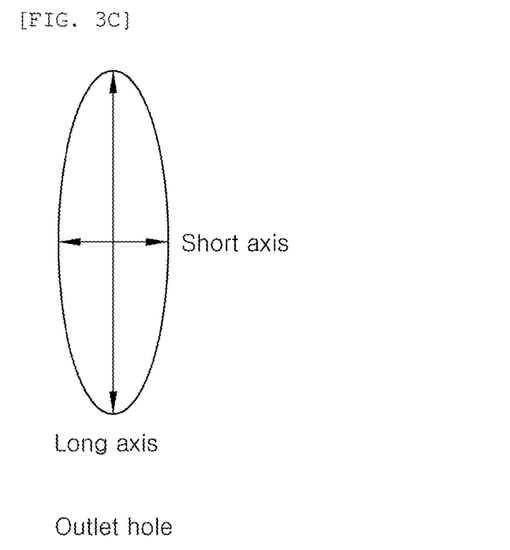

Further, as shown in FIG. 3A, the inlet holes 12 and the outlet holes 14 may be formed in different shapes. For example, the inlet holes 12 may be formed in a rectangular shape and the outlet holes 14 may be formed in an elliptical shape, as shown in FIGS. 3A to 3C. When the inlet holes 12 are formed in a rectangular shape and the outlet holes 14 are formed in an elliptical shape, the rectangle may be larger in size than the ellipse, as shown in FIGS. 3B and 3C, under the assumption that they have the same lengths of long axis and short axis, so the inlet holes 12 are formed in a rectangular shape and the outlet holes 14 are formed in an elliptical shape in FIGS. 3A to 3C.

Obviously, it may be considered to make the outlet holes 14 smaller in size than the inlet holes 12 by adjusting the lengths of the long axis and the short axis. In this case, the more the lengths are reduced, the larger the difference in size between the outlet holes 14 and the inlet holes 12, so the flow speed of the reaction gas is further increased. However, if the difference is too large, the pressure difference in the fuel cell increases and the efficiency of the fuel cell system may be decreased. Accordingly, the difference may be limited to a predetermined level, and the present disclosure proposes that the lengths of the long axis and the short axis of the outlet holes 14 be limited to ½ or more of the lengths of the long axis and the short axis of the inlet holes 12.

As described above, since the greater the difference between the size of the inlet hole 12 and the size of the outlet hole 12, the greater the increase in the flow speed of a reaction gas, the reaction efficiency of a fuel cell can be improved, but when the inlet holes 12 and the outlet holes 14 of all of the separators 10 of a fuel cell are formed in this way, the pressure difference between the upstream side and the downstream side of a channel for a reaction gas becomes too large, so the efficiency of the fuel cell system may be reduced. Accordingly, in order to compensate for this disadvantage, an exemplary embodiment in the present disclosure includes a separator 10 in which inlet holes 12 are made larger in size than outlet holes 14 at the upstream side of a channel through which a reaction gas flows in, while the difference in size between the inlet holes 12' and outlet holes 14' at the downstream side of the channel through which a reaction gas is discharged is made smaller than the difference in size between the inlet holes 12 and the outlet holes 14 at the upstream side of the channel.

Figure 5:
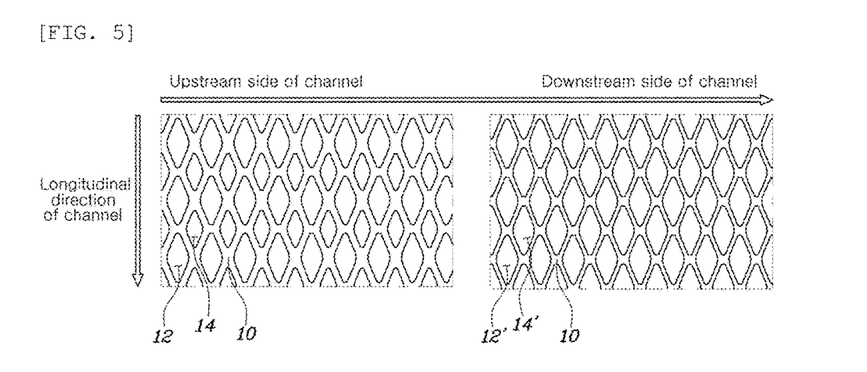
FIG. 5 is a view comparing the sizes of inlet holes and outlet holes at the upstream side and the downstream side of a channel in a fuel cell according to an exemplary embodiment in the present disclosure.

FIG. 5 shows the separator 10 having this structure, in which it can be seen that the difference in size between the inlet holes 12 and the outlet holes 14 at the upstream side of a channel is visually clear, but the sizes of the inlet holes 12' and the outlet holes 14' at the downstream side of the channel are almost the same. Accordingly, it is possible to increase the disturbance of flow at the upstream side of a channel where the flow of a reaction gas has not been sufficiently developed by making the sizes of the inlet holes 12 and the outlet holes 14 different, and it is possible to smoothly discharge produced water and maintain the internal pressure difference at an appropriate level on the downstream side of the channel, where the flow of the reaction gas has been sufficiently developed, by making the sizes of the holes similar.

It has been described above that the difference in size between the inlet holes 12' and the outlet holes 14' at the downstream side of a channel is set smaller than the difference in size of the inlet holes 12 and the outlet holes 14 at the upstream side, that is, the difference in size between the inlet holes 12' and the outlet holes 14' at the downstream side has only to be smaller than the difference in size between the inlet holes 12 and the outlet holes 14 at the upstream side, but the outlet holes 14' should not be larger in size than the inlet holes 12'. Further, it would most ideal for the inlet holes 12' and the outlet holes 14' at the downstream side of a channel to be the same size, considering the characteristics at the downstream side described above.

Although the present invention has been described with reference to exemplary embodiments shown in the drawings, it is apparent to those skilled in the art that the present invention may be changed and modified in various ways without departing from the scope of the present invention, which is described in the following claims.

What is claimed is:
1. A separator for a fuel cell comprising:
a plurality of channels; and
an inlet hole and an outlet hole formed in a first side and a second side of the plurality of channels, respectively, such that a reaction gas flows into and out from the separator to be exposed to a reaction surface including a membrane electrode assembly,
wherein the inlet hole is larger in size than the outlet hole,
wherein a plurality of inlet holes and a plurality of outlet holes are formed in a longitudinal direction of the plurality of channels, and centers of the plurality of inlet holes and centers of the plurality of outlet holes are not aligned, wherein the centers of the plurality of inlet holes are positioned higher above the reaction surface than the centers of the plurality of outlet holes.

2. The separator of claim 1, wherein the inlet hole and the outlet hole are formed such that the reaction gas flowing into and out from the separator perpendicular to the longitudinal direction of the plurality of channels is guided to the reaction surface.

3. The separator of claim 1, wherein the plurality of inlet holes and the plurality of outlet holes have different shapes.

4. The separator of claim 3, wherein the plurality of inlet holes have a rectangular shape and the plurality of outlet holes have an elliptical shape.

5. The separator of claim 4, wherein lengths of a long axis and a short axis of the plurality of outlet holes are ½ or more of lengths of a long axis and a short axis of the plurality of inlet holes, respectively.

6. The separator of claim 1, wherein the separator is wavy, and the first side is an inclined side through which the reaction gas flows into the separator and the second side is an inclined side through which the reaction gas flows out from the separator.

7. The separator of claim 1, wherein a difference in size between an inlet hole and an outlet hole at a downstream side of the plurality of channels through which the reaction gas is discharged is smaller than a difference in size between an inlet hole and an outlet hole at an upstream side of the plurality of channels.

8. A fuel cell comprising:
a separator including a plurality of channels, and an inlet hole and an outlet hole respectively formed in a first side and a second side of the plurality of channels such that a reaction gas flows into and out from the separator to be exposed to a reaction surface including a membrane electrode assembly, the inlet hole being larger in size than the outlet hole; and
a gas diffusion layer disposed between a bottom of the separator and the membrane electrode assembly and activating and guiding a reaction gas flowing inside through the inlet hole to the membrane electrode assembly,
wherein a plurality of inlet holes and a plurality of outlet holes are formed in a longitudinal direction of the plurality of channels, and centers of the plurality of inlet holes and centers of the plurality of outlet holes are not aligned,
wherein the centers of the plurality of inlet holes are positioned higher above the reaction surface than the centers of the plurality of outlet holes.

* * * * *